US007622525B2

(12) United States Patent
Ukai et al.

(10) Patent No.: US 7,622,525 B2
(45) Date of Patent: Nov. 24, 2009

(54) TWO-PART CURABLE COMPOSITION

(75) Inventors: Masaki Ukai, Takarazuka (JP); Hitoshi Ohno, Osaka (JP); Koichiro Masunaga, Yao (JP); Mutsuhisa Miyamoto, Osaka (JP); Kazunobu Takami, Takatsuki (JP)

(73) Assignee: Sunstar Giken Kabushiki Kaisha, Osaka (JP)

( * ) Notice: Subject to any disclaimer, the term of this patent is extended or adjusted under 35 U.S.C. 154(b) by 0 days.

(21) Appl. No.: 10/568,072

(22) PCT Filed: Aug. 12, 2004

(86) PCT No.: PCT/JP2004/011593

§ 371 (c)(1),
(2), (4) Date: Feb. 13, 2006

(87) PCT Pub. No.: WO2005/017045

PCT Pub. Date: Feb. 24, 2005

(65) Prior Publication Data

US 2006/0293437 A1 Dec. 28, 2006

(30) Foreign Application Priority Data

Aug. 13, 2003 (JP) ............................ 2003-293053

(51) Int. Cl.
*C08L 31/00* (2006.01)
*C08L 33/06* (2006.01)
*C08L 27/06* (2006.01)
*C08K 5/101* (2006.01)

(52) U.S. Cl. ....................... 524/556; 524/560; 524/567; 524/284

(58) Field of Classification Search ................. 524/556, 524/560, 567, 284
See application file for complete search history.

(56) References Cited

U.S. PATENT DOCUMENTS

| | | | | | |
|---|---|---|---|---|---|
| 2,872,429 | A | * | 2/1959 | Schwartz | 524/306 |
| 3,772,237 | A | * | 11/1973 | Bullman | 524/188 |
| 4,386,992 | A | * | 6/1983 | Takegawa et al. | 156/327 |
| 5,166,229 | A | * | 11/1992 | Nakano et al. | 523/447 |
| 5,698,059 | A | | 12/1997 | Bilski et al. | |

FOREIGN PATENT DOCUMENTS

| | | | | |
|---|---|---|---|---|
| EP | 0 433 069 | A2 | | 6/1991 |
| EP | 433069 | A2 | * | 6/1991 |
| EP | 1 090 960 | A1 | | 4/2001 |
| EP | 1 283 229 | A1 | | 2/2003 |
| GB | 1 157 436 | | | 7/1969 |
| GB | 1157436 | | * | 9/1996 |
| JP | 6234827 | A | | 8/1994 |
| JP | 8500531 | W | | 1/1996 |
| JP | 8165398 | A | | 6/1996 |
| JP | 2001040329 | A | | 2/2001 |
| WO | WO 94/11083 | | | 5/1994 |
| WO | WO 01/88011 | A1 | | 11/2001 |

* cited by examiner

*Primary Examiner*—Vasu Jagannathan
*Assistant Examiner*—Karuna P Reddy
(74) *Attorney, Agent, or Firm*—Jacobson Holman PLLC

(57) ABSTRACT

A two-pack curable composition of the present invention comprises plastisol liquid A which comppounds a thermoplastic resin and a plasticizer, and liquid B which compounds a gelling agent and is characterized in that it has a sprayable viscosity when liquids A and B are mixed and gels within 30 seconds to 60 minutes after application. This two-pack curable composition can be applied in a body-welding step of an automobile manufacturing line as a body or seam sealer (for water-proofing, air-tightness, dust-proofing or rust-prevention of welded areas), an underbody coating (for anti-chipping), or an adhesive.

10 Claims, 1 Drawing Sheet

TWO-PART CURABLE COMPOSITION

This is a nationalization of PCT/JP2004/011593 filed 12 Aug. 2004 and published in Japanese.

FIELD OF THE INVENTION

The present invention relates to a two-pack curable composition. More particularly, the present invention relates to a two-pack curable composition, in particular, a two-pack curable composition used in an automobile manufacturing line, which comprises a plastisol compounding a thermoplastic resin and a plasticizer, and a gelling agent. When the components of the two-pack composition of the present invention are mixed and applied to a substrate, the mixture of the components as a whole gels at room temperature, that is, gelation, whereby the deformation and drop-off of the mixture caused by handling or showering in subsequent steps are prevented, and subsequently heated to form a completely cured material. The two-pack curable composition of the present invention has good adhesion to an oil-treated steel plate, for example, and thus it can be applied in a body-welding step of an automobile manufacturing line as a body or seam sealer (for water-proofing, air-tightness, dust-proofing or rust-prevention of welded areas), an underbody coating (for anti-chipping), or an adhesive. In addition, the present invention relates to a sealing process, a coating process and a bonding process of an automobile body part or article using the two-pack curable composition of the present invention.

The two-pack curable composition of the present invention can be used as a sealer of automobile body parts or articles such as a filter element and a housing of an oil filter, or as a coating of a fuel tank. Furthermore, the two-pack curable composition of the present invention can be applied to various industrial products or their parts, or molded articles.

DESCRIPTION OF BACKGROUND ART

In a sealing process of automobile body parts in an automobile manufacturing line which includes a body-welding step, coating steps and assembly steps, automobile body parts, which are press molded, are built up by spot welding in the first body-welding step. In this step, gaps are formed in joining areas of the automobile body parts due to the distortion of the body panels between the welding spots. Therefore, a body or seam sealer is applied to the gaps for the purpose of water-proofing, dust-proofing, air-tightness and anti-rusting in the joining areas of the automobile body parts.

In such a sealing process, a body or seam sealer comprising a one-pack heat curable composition is typically used. In general, in the coating step following the body-welding step, the automobile body parts are showered, pretreated and electrodeposition coated followed by baking in an electrodeposition oven, and then a body sealer is applied to the gaps having the joining areas of the automobile body parts. Thereafter, the automobile body parts are conveyed to a body sealer oven and then to primer painting, middle painting and top painting steps. Finally, the automobile body parts are conveyed to the assembly step.

However, the conventional one-pack heat curable sealer composition requires a sealer oven to cure the composition, and it has a serious problem that it deteriorates the appearance of a top paint due to dusts during the application of the sealer composition.

In the process of the production of oil filters, a sealer composition is partially cured, namely, kiss-gelled with UV ray or a heat source to prevent the damage of the uncured sealer composition during conveying the filters to a curing oven, and then completely cured by heating (see, for example, JP-A-8-500531). However, this process additionally requires a UV-radiation apparatus or a heating apparatus as an energy source to partially cure the sealer composition, which is less advantageous from the viewpoint of equipment expenses and energy costs.

DISCLOSURE OF THE INVENTION

Problems to be Solved by the Invention

In view of the above problems associated with the conventional sealing process, the primary object of the present invention is to provide a composition which makes it possible to carry out a sealing process in a body-welding step rather than in a coating step in which a sealer damages the appearance of a coating, eliminates the use of a sealer oven and can be applied as a sprayable sealer composition. Another object of the present invention is to provide a sealing process, a coating process and a bonding process of automobile body parts or articles using such a composition.

Means for Solving Problems

The present inventors have carried out extensive studies to achieve the above objects, and have found that the above objects are achieved by a two-pack curable composition comprising plastisol liquid A compounding a thermoplastic resin and a plasticizer, and liquid B compounding a gelling agent, and completed the present invention.

Herein, the term "gelation" means that a plastisol loses flowability to solidify, and the term "gelling agent" means a component which can cause the gelation of a plastisol comprising a thermoplastic resin dispersed in a plasticizer at room temperature. Concretely, a plasticizer, a high-boiling solvent, an organic solvent, or a monomer of a thermoplastic resin as a gelling agent, in which the thermoplastic resin as a dispersoid of plastisol liquid A can be dispersed, may be used independently or as a mixture thereof. The gelling agent converts the thermoplastic resin from a colloidal dispersion state to a solution state, whereby the viscosity of the plastisol increases and the plastisol gels.

Namely, as shown in FIG. 1, for example, when plastisol liquid A 1 comprising a thermoplastic resin 11 and a plasticizer 12, and liquid B 2 compounding a gelling agent 21 are mixed, the mixture has such a viscosity that it can be spray applied just after mixing, and then the thermoplastic resin 11 in plastisol liquid A 1 is dissolved in and swelled with the gelling agent 21 in liquid B 2 as time advances, so that the mixture as a whole gels at room temperature to form a swelled gel 3. Such gelation of the mixture can prevent the deformation and drop-off caused by handling. Thereafter, the mixture is heated and cured to form a cured material 4.

Accordingly, when the two-pack composition comprising liquid A and liquid B is used as a body or seam sealer, the sealing process can be carried out by applying the body or seam sealer to automobile body parts which have been press molded and assembled by spot welding in the body-welding step, and then the welded body parts are supplied to the coating step starting from showering, since the composition has sufficient resistance to showering required in the showering step because of the gelation. Furthermore, any sealer oven can be eliminated since the gelled two-pack curable composition can be completely cured in an electrodeposition oven in the coating step.

Besides the sealing process, a coating process is employed in the automobile manufacturing line for the purpose of anti-chipping to prevent damages caused by flying stones or other colliding objects during running. Conventionally, the coating process is carried out in the same process stage as the sealing process, that is, after the electrodeposition and baking in the electrodeposition oven. From the same viewpoint as in the case of the conventional sealing process, it is desired to carry out, the coating process in the body-welding step. As a result of the study by the present inventors, it has been found that the two-pack curable composition of the present invention can sufficiently be used as an underbody coating.

Furthermore, besides the sealing process, an bonding process is employed in the automobile manufacturing line to join a reinforcement member to an outer panel for the purpose of reducing the flapping of the outer panel and providing tension and stiffness to the panel. Adhesives which are conventionally used for the above purposes are formulated to have a high viscosity so that they have necessary resistance to showering in the course of the electrodeposition step of the coating step after bonding. Therefore, such adhesives have problems such that they increase equipment costs for the application thereof, or that they severely damage the quality of the electrodeposition if they drop off in the showering step. It has been found, to solve these problems, the two-pack curable composition of the present invention can be used as an adhesive in the bonding process.

According to the first aspect of the present invention, there is provided a two-pack curable composition comprising plastisol liquid A which compounds a thermoplastic resin and a plasticizer, and liquid B which compounds a gelling agent, wherein said composition gels at room temperature on mixing liquid A and liquid B.

According to the second aspect of the present invention, there is provided a process for sealing automobile body parts comprising the steps of applying, as a body or seam sealer, a two-pack curable composition according to the present invention to automobile body parts assembled by spot-welding the parts which have been press molded in a body-welding step of an automobile manufacturing line and then passing them in a coating step and an assembling step while the composition is in a gelled state.

According to the third aspect of the present invention, there is provided a process for underbody coating of automobile body parts comprising the steps of applying, as an underbody coating, a two-pack curable composition according to the present invention to the automobile body parts assembled by spot-welding the parts which have been press molded in a body-welding step of an automobile manufacturing line and then passing them in a coating step and an assembling step while the composition is in a gelled state.

According to the fourth aspect of the present invention, there is provided a process for bonding automobile body parts comprising the steps of applying, as an adhesive, a two-pack curable composition according to the present invention to the automobile body parts or articles which have been press molded in a body-welding step of an automobile manufacturing line and gelling the composition, whereby the deformation of the adhesive is prevented in subsequent treating steps of the parts.

A two part curable composition wherein the gelling time of the mixture of liquids A and B is from 30 seconds to 60 minutes at room temperature after mixing.

EXPLANATION OF REFERENCE NUMBERS

Figure 1:
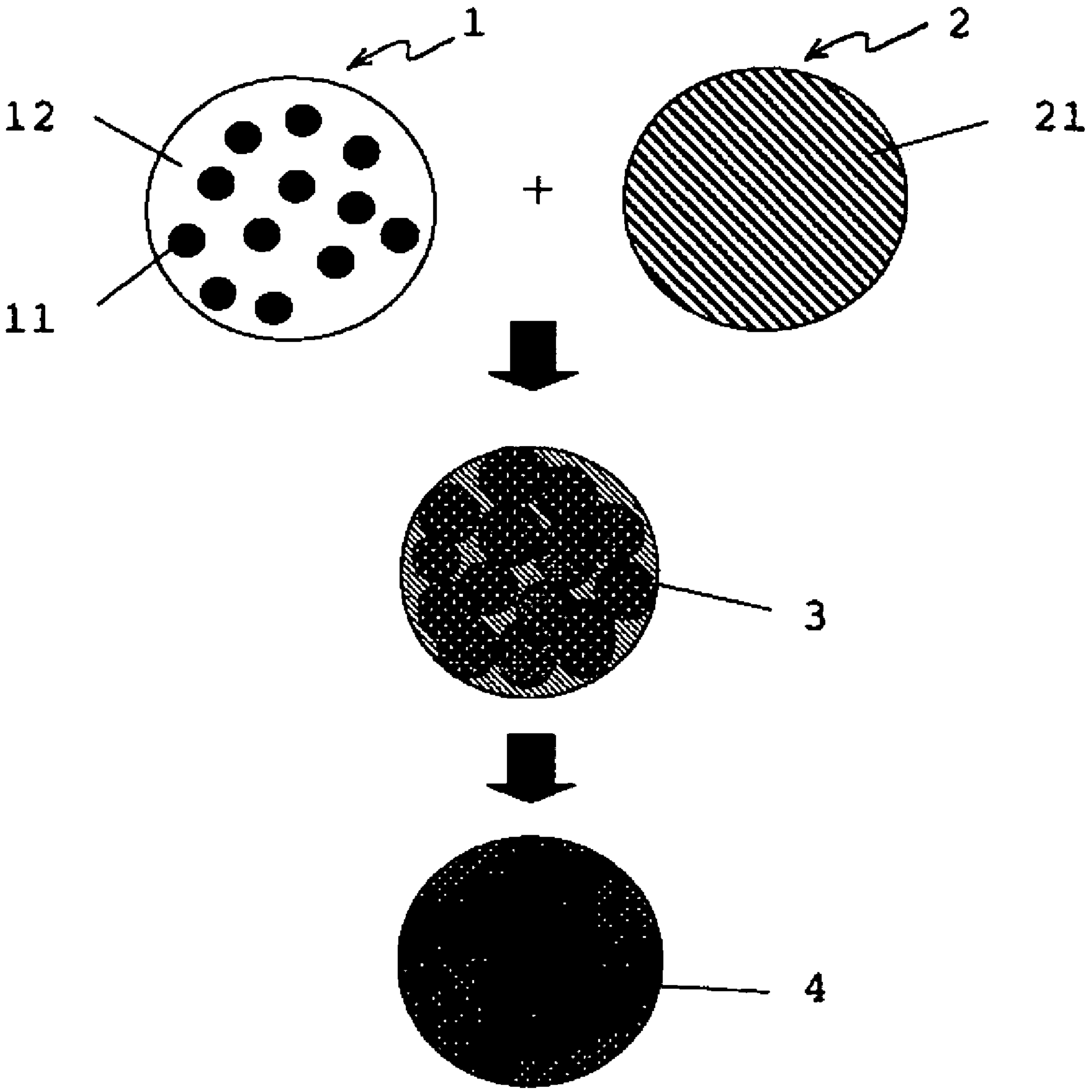
FIG. 1 is a schematic drawing explaining the steps from the gelation to the complete curing of a two-pack curable composition according to the present invention.

1: Liquid A, 2: Liquid B, 3: Swelled gel, 4: Completely cured material

11: Thermoplastic resin, 12: Plasticizer, 21: Gelling agent

BEST EMBODIMENTS FOR CARRYING OUT THE INVENTION

The thermoplastic resin used in the present invention is not particularly limited, and any conventional thermoplastic resin can be used. Examples of the thermoplastic resin are acrylic resins; MBS resins (methyl methacrylate-butadiene-styrene resin); polyvinyl chloride; vinyl chloride copolymers (e.g. vinyl chloride-vinyl acetate copolymer, vinyl chloride-vinyl acetate-maleic acid copolymer, vinyl chloride-vinyl acetate-vinyl alcohol copolymer, etc.); ionomer resins; AAS resins (acrylonitrile-styrene-special rubber resins); AES resins (acrylonitrile-EPDM-styrene resins); AS resins (acrylonitrile-styrene resins); ABS resins (acrylonitrile-butadiene-styrene resins); polyurethane resins; polyester resins; and the like. They may be used independently or as a mixture of two or more of them. Among them, acrylic resins are preferable.

Examples of the acrylic resins include homopolymers or copolymers of alkyl acrylates (e.g. methyl, ethyl, butyl and 2-ethylhexyl acrylates) or alkyl methacrylates (e.g. methyl, ethyl, butyl, lauryl and stearyl methacrylates), or copolymers of such acrylates or methacrylates with other acrylic monomers (e.g. methacrylic acid, acrylic acid, itaconic acid etc.); core-shell type acrylic resins prepared by polymerizing at least one of ethyl methacrylate, n-butyl methacrylate, isobutyl methacrylate, sec-butyl methacrylate, tert-butyl methacrylate, ethylhexyl methacrylate, ethyl acrylate, n-butyl acrylate, sec-butyl acrylate and tert-butyl acrylate (referred to as "Monomer A"), and a mixture of at least one of methyl methacrylate and benzyl methacrylate and at least one of methacrylic acid, acrylic acid, itaconic acid and crotonic acid (referred to as "Mixed monomer B"); core-shell type acrylic resins prepared by polymerizing Monomer A and Mixed monomer B with continuously or stepwise changing a ratio of Monomer A to Mixed monomer B, and gradient type acrylic resins. Among them, core-shell type or gradient type acrylic resins, which have a weight average molecular weight of 1,000 to 2,000,000 and a primary and/or secondary particle (agglomerates of primary particles) size of 0.1 to 100 μm, are preferable.

Examples of the plastcizer compounded in plastisol liquid A are polyester plasticizers such as phthalates (e.g. di(2-ethylhexyl) phthalate, butylbenzyl phthalate, dinonyl phthalate, diisononyl phthalate, diisodecyl phthalate, diundecyl phthalate, diheptyl phthalate, butylphthalylbutyl glycolate, etc.), adipates and sebacates (e.g. dioctyl adipate, didecyl adipate, dioctyl sebacate, etc.), trimellitates, and so on.

As a gelling agent compounded in liquid B used in the present invention, a plasticizer, a high-boiling solvent, a solvent or a monomer, which can dissolve or swell the thermoplastic resin in liquid A, may be used. In particular, when plastisol liquid A compounds an acrylic resin as a thermoplastic resin, a monomer or monomers used in the polymerization such as 2-hydroxyethyl(meth)acrylate, 2-hydroxypropyl-(meth)acrylate, butyl(meth)acrylate, (meth)acrylic acid, methyl(meth)acrylate, glycidyl (meth)acrylate, etc. can be used. As a plasticizer used as a gelling agent for a thermoplastic resin, in particular an acrylic resin, a plasticizer which has good compatibility with the resin and dissolves or swells the resin is used.

In combination with or instead of the plasticizer compounded in liquid A, one or more of the following compounds may be used: esters of phthalic acid, diesters of adipic acid (e.g. dioctyl adipate, etc.), diesters of sebacic acid (e.g. dioctyl sebacate, etc.), esters of phosphoric acid (e.g. tributyl phosphate, tris(2-ethylhexyl)phosphate, etc.), epoxide type plasticizers (e.g. epoxidized soybean oil, etc.), esters of benzoic acid (e.g. polyoxyethylene glycol dibenzoate, polyoxypropylene glycol dibenzoate, diethylene glycol dibenzoate, 2,2-dimethyl-1,3-propanediol dibenzoate, pentaerithritol tetrabenzoate, etc.), esters of fumaric acid (e.g. diethyl fumarate, dibutyl fumarate, dihexyl fumarate, dioctyl fumarate, bis(2-ethylhexyl) fumarate, dinonyl fumarate, diisononyl fumarate, didecyl fumarate, dibenzyl fumarate, dioleyl fumarate, octyl-2-ethylhexyl fumarate, 2-ethylhexylisononyl fumarate, butylbenzyl fumarate, monoethyl fumarate, monooctyl fumarate, mono-2-ethylhexyl fumarate, monodecyl fumarate, etc.), esters of sulfonic acids (e.g. phenol type alkyl sulfonates, cresol type alkyl sulfonates, etc.), and so on.

As a high-boiling solvent, an organic solvent having a boiling point of at least 140° C. under atmospheric pressure may be used. In practice, there may be used process oil, petroleum fraction oil, ethylene glycol ethyl ether acetate (cellosolve acetate), propylene glycol methyl ether acetate, (PGMAC), ethylene glycol methyl ether acetate (methoxycellosolve acetate), propylene glycol ethyl ether propionate, ethylene glycol ethyl ether propionate, and mixtures of two or more of them. They may be used in admixture with an apolar solvent such as naphthene, paraffin, etc., although they have a boiling point of at least 140° C. and a high dissolving power since they are polar solvents. When the solvent has a high dissolving power with a thermoplastic resin, a gelling time tends to be shortened. The dissolving and swelling powder of the solvent for a thermoplastic resin is selected based on the relationship with the plasticizer in liquid A.

Examples of organic solvents for dissolving a thermoplastic resin are toluene, xylene, acetone, methyl ethyl ketone, methyl isobutyl ketone, ethyl acetate, butyl acetate, N-methyl-2-pyrrolidone, etc. They may be used independently or as a mixture thereof. Preferably, the organic solvent is used in combination with a plasticizer. The gelling agent to be used in the present invention is not limited to those described above, and may be selected based on the relationship with plastisol liquid A compounding various thermoplastic resins and various plasticizers.

When an acrylic resin is used as a thermoplastic resin in the present invention, a gelling agent is preferably a (meth)acrylate ester, or a mixture of a (meth)acrylate ester with a benzoate ester. Among them, a mixture of 2-hydroxyethyl acrylate and diethylene glycol dibenzoate, and a mixture of glycidyl methacrylate and diethylene glycol dibenzoate are preferable.

The two-pack curable composition of the present invention comprises plastisol liquid A compounding the thermoplastic resin and the plasticizer as the main components, and liquid B compounding the gelling agent. The gelling agent of the composition of the present invention usually is used in an amount of 50 to 150 parts ("parts by weight", hereinafter the same), preferably 75 to 125 parts, per 100 parts of the thermoplastic resin. When the amount of the gelling agent is less than 50 parts, the gelling time after mixing is prolonged so that the conveying of the mixture to a subsequent step is delayed. When the amount of the gelling agent exceeds 150 parts, the gelling time after mixing is too short so that the application of the mixture tends to be made difficult.

The plasticizer is used usually in an amount of 75 to 200 parts, preferably 80 to 150 parts, per 100 parts of the thermoplastic resin.

In the actual applications as a sealer (a body sealer or a seam sealer), an underbody coating or an adhesive, the two-pack curable composition of the present invention may optionally compound conventional additives.

Examples of the additives include fillers such as clay, calcium carbonate (e.g. heavy calcium carbonate, precipitated calcium carbonate, surface-treated calcium carbonate, etc.), magnesium carbonate, titanium oxide, casting plaster, barium sulfate, zinc oxide, silicic acid, mica powder, talc, bentonite, silica, glass powder, red iron oxide, carbon black, graphite powder, alumina, SHIRASU balloons, ceramic balloons, glass balloons, plastic balloons, metal powder, and so on. The additive may usually be used in an amount of 20 to 60% by weight of the two-pack curable composition.

Besides the thermoplastic resin in liquid A of the present invention, a thermosetting resin and a latent curing agent thereof may be used in combination. As a thermosetting resin, an epoxy resin may be used, and examples of the epoxy resin include glycidyl-ether type, glycidyl ester type, glycidyl amine type, linear aliphatic epoxide type and alicyclic epoxide type epoxy resins; modified resins of these epoxy resins such as rubber-modified epoxy resins-[for example, reaction products of bisphenol type epoxy resins (e.g. diglycidyl ethers of bisphehol A, bisphenol F or bisphenol AD or diglycidyl ether of alkylene oxide adducts of bisphenol A) with butadiene-acrylonitrile-(meth)acrylic acid copolymers], urethane-modified epoxy resins [for example, reaction products of a terminal NCO group-containing urethane prepolymer, which is prepared by reacting polytetramethylene ether glycol having a molecular weight of 500 to 5000 and an excessive amount of a diisocyanate (e.g. tolylene diisocyanate or diphenylmethane diisocyanate) with a OH-containing epoxy resin (e.g diglycidyl ether of bisphenol A or diglycidyl ether of a polyhydric aliphatic alcohol)], thiocol-modified epoxy resins, and so on.

Examples of the latent curing agent to be used in combination with such epoxy resins include dicyandiamide, 4,4'-diaminodiphenylsulfone, imidazole derivatives (e.g. 2-n-heptadecylimidazole, etc.), hydrazide derivatives (e.g. adipic acid dihydrazide, dodecanoic acid dihydrazide, sebacic acid dihydrazide, isophthalic acid dihydrazide, 1,3-bis(hydrazinocarboethyl)-5-isopropylhydantoin, eicosanedioic acid dihydrazide, hydroquinonediglycolic acid dihydrazide, resorcinoldiglycolic acid dihydrazide, 4,4'-ethylidenebisphenoldiglycolic acid dihydrazide, etc.), N,N-dialkylurea derivatives, N,N-dialkylthiourea derivatives, melamine derivatives, diaminodiphenylmethane, diamino-biphenyl, phenylenediamine, tolylenediamine, dodecane-diamine, decanediamine, octanediamine, tetradecanediamine, hexadecanediamine, polyoxypropylenediamine, etc.

They may be compounded in at least one of liquids A and B of the two-pack curable composition of the present invention. Usually, they are used in an amount of 1 to 20 parts per 100 parts of the thermoplastic resin in liquid A. Thereby, the properties and durability of the completely cured material of the two-pack curable composition can be improved.

Besides the epoxy resin and the latent curing agent thereof, the two-pack curable composition of the present invention may compound a polyurethane resin and a curing agent thereof as a thermosetting resin. For example, a combination of a polyisocyanate compound or a blocked polyurethane prepolymer such as a terminal NCO group-containing polyurethane prepolymer the active NCO groups of which are blocked with a blocking agent, and a latent curing agent such as a polyol or a polyamine an active hydrogen of which is deactivated with a blocking agent may be used.

A blowing agent may be used as a further additive. The kind of a blowing agent is not particularly limited. Typical examples of the blowing agent are thermally decomposable organic blowing agents such as azo compounds (e.g. azodicarboneamide, azobisisobutyronitrile, etc.), nitroso compounds (e.g. dinitrosopentamethylenetetramine, etc.), hydrazide compounds (e.g. p-toluenesulfonylhydrazide, 4,4'-oxybenzenesulfonylhydrazide, etc.), and so on. An expandable microcapsule type blowing agent which is quickly expanded by heat may be used. Examples of such a microcapsule type blowing agent include MICROPEARL F-80S, MICROPEARL F-82 and MICROPERL F-80VS (all available from Matsumoto Yushi-Seiyaku Co., Ltd.), Expancel 091, Expancel 091-80, Expancel 091-140, Expancel 092-120 and Expancel 093-120 (all available from AKZO NOBEL), a blowing agent comprising an outer shell made of an acrylonitrile-methacrylonitrile-vinyl acetate copolymer and a volatile liquid encapsulated in the outer shell. A blowing agent having a blowing temperature is from 160° C. to 220° C. is used.

The two-pack curable composition of the present invention may optionally compound a tackifier. The tackifier may be a conventional one such as a polyamide type tackifier, an isocyanate type tackifier, etc. Examples of the polyamide type tackifier include polyamideamine prepared by condensing a dimer acid and a polyamine, etc. Examples of the isocyanate type tackifier include oligomers of tolylene diisocyanate, blocked isocyanate (NCO) polymer comprising polyurethane prepolymer active NCO groups of which are blocked, etc.

Furthermore, liquid A and/or liquid B of the present invention may compound suitable amounts of a hygroscopic agent (e.g. calcium oxide, molecular sieves, etc.), thixotropic agents (e.g. organic bentonite, fumed silica, aluminum stearate, castor oil derivatives, etc.), stabilizers (e.g. 2,6-di-tert-butyl-4-methylphenol, 2,2-methylene-bis(4-methyl-6-tert-butylphenol), nickel dibutyl-dithiocarbamate, metal soaps, etc.). These additives may be adequately distributed to liquid A and/or liquid B.

Just after mixing liquid A and liquid B of the two-pack curable composition of the present invention, the mixture usually has a viscosity of 50 to 200 Pa.s (at 20° C.), in which range the mixture can be applied, and it can be spray applied with an automated robot system.

When the mixture having the above viscosity is applied, a gel as shown in FIG. 1 is formed usually within 30 seconds to 60 minutes, and the gel has sufficient resistance to showering as described above.

Hereinafter, the sealing process, coating process and bonding process of automobile body parts using the two-pack curable composition of the present invention (the mixture of liquids A and B) will be explained in detail.

Each of the sealing process, coating process and bonding process of the present invention is carried out in the first body-welding step of the automobile manufacturing line (including a body-welding step, coating steps and assembly steps) according to the procedures described below.

Firstly, automobile body parts which have been produced by press molding are assembled by spot welding. Then, the mixture of liquids A and B of the two-pack curable composition is automatically applied preferably with a robot to gaps between the automobile parts and an engine housing, a floor, a roof, a dashboard, a trunk, doors, etc. in the sealing process, or onto wheel housings, rocker panels, backsides of automobile body, etc. in the coating process, at a suitable thickness of, for example, 0.5 to 10 mm in the case of the sealing process, 0.2 to 5 mm in the case of the coating process, or 5 to 20 mm in the case of the bonding process.

In the bonding process, the mixture of liquids A and B of the two-pack curable composition is automatically applied preferably with a robot to an outer panel which has been press molded in a dot form having a diameter of 10 to 30 mm or a bead form having a diameter of 10 to 20 mm. Immediately after applying, a reinforcement member is attached to a part of the outer panel to which the mixture is applied.

After applying, the mixture is kept standing for 30 seconds to 60 minutes to allow it to gel. Then, the parts are subjected to coating steps (showering–>pretreatment–>electrodeposition–>baking in an electrodeposition oven–>middle and top painting–>baking in a middle and top painting oven), and assembling steps (assembling–>inspection).

Since the coating film of the mixture which gelled has good shape maintenance properties, it has good resistance to showering and does not fly about, dissolve or drop off in a phosphate treating liquid or the electrodeposition liquid. Then, the mixture is completely cured by heat treatment under the baking conditions in the electrodeposition oven usually at a temperature of 140 to 220° C. for 10 to 60 minutes.

EXAMPLES

Hereinafter, the present invention will be illustrated by Examples and Comparative Examples.

Examples 1-4 and Comparative Examples 1-2

(1) Preparation of Two-Pack Curable Composition

The respective components shown in Table 1 were compounded in amounts indicated in the sections of liquid A and liquid B of Table 1 and stirred in a mixer for 30 minutes followed by defoaming under reduced pressure for 30 minutes to obtain liquid A and liquid B, respectively.

(2) Storage Stability (Results Reported in Table 1)

Each of liquid A and liquid B is stored at 40° C. for one week. The viscosity of the liquid is measured before and after storage with a Blookfield rotary viscometer (20° C., No. 7 rotor, 10 rpm). Then, a change (%) of the viscosity is calculated to evaluate the storage stability.

(3) Performance tests (results reported in Table 1)

Liquids A and B are mixed with a static mixer at 23° C., and immediately subjected to the following performance tests.

i) Gelation Property at Room Temperature

A mixture is kept standing at 23° C., and a time (minutes) until the gelation is measured by finger touching.

ii) Shear Adhesion Test (MPa)

Using an SPCC steel plate of 25×100×1 mm, a shear adhesion test piece having a lapping length of 25 mm and a clearance of 1 mm is produced and then baked at 170° C. for 20 minutes followed by cooling to 20° C. Then, a shear adhesion strength is measured.

iii) Properties of Cured Materials (Strength at Break (MPa) and Elongation at Break (%))

A JIS No. 2 dumbbell shaped test piece having a thickness of 2 mm is produced, baked at 170° C. for 20 minutes and then cooled to 20° C. Thereafter, strength and elongation at break are measured.

iv) Resistance to Showering

A mixture is applied to a SPCC steel plate at a thickness of 1 mm and kept standing at 23° C. for 30 minutes. Then, the test piece is set up vertically, and a hot water at 50° C. is sprayed under a pressure of 3 kg/cm$^2$ onto the coated surface of the specimen from a nozzle (K9A PT1/4×5.0 manufactured by KATORI Manufacturing Ltd.) provided at a distance of 1 m from the surface in a direction perpendicular (90 degrees) to the surface. Then, the change of appearance of the coated surface is evaluated (A: no change; B: the coated material flying about).

v) Resistance to Chipping

A mixture is applied to a SPCC steel plate at a thickness of 0.5 mm, baked at 170° C. for 20 minutes followed by cooling to 20° C. to obtain a test piece. The test piece is placed at an angle of 45 degrees, and a M4 nut is dropped on the specimen from a height of 2 m through a 35 mmϕ polyvinyl chloride tube. The accumulated weight (kg) of the nut until the coating film is broken is calculated.

TABLE 1

| Examples | | Example No. 1 | 2 | 3 | 4 | Comp. Ex. No. 1 | 2 |
|---|---|---|---|---|---|---|---|
| Liquid A | Diisononyl phthalate | 100 | 100 | 100 | 100 | 100 | 50 |
| | Acrylic resin | 100 | 100 | 100 | 100 | 100 | 100 |
| | 2-Hydroxyethyl acrylate | | | | | | 50 |
| | Cumene hydroperoxide | | | 0.1 | | | |
| | Dicyanediaminde | 7 | 7 | 7 | 7 | 7 | 7 |
| Liquid B | 2-Hydroxyethyl acrylate | 40 | 68 | 40 | | | 40 |
| | Glycidyl methacrylate | | | | 64 | | |
| | Diethylene glycol dibenzoate | 64 | 36 | 64 | 40 | | 64 |
| | Diisononyl phthalate | | | | | 104 | |
| | Vanadium pentoxide | | | 0.1 | | | |
| | Bisphenol F epoxy resin | 7 | 7 | 7 | 7 | 7 | 7 |
| | Calcium oxide | 14 | 14 | 14 | 14 | 14 | 14 |
| | Calcium carbonate | 189 | 189 | 189 | 189 | 189 | 189 |
| | Surface-treated calcium carbonate | 36 | 36 | 36 | 100 | 36 | 36 |
| Storage stability (%) | Liquid A | +30 | +30 | +30 | +30 | +30 | Gelled |
| | Liquid B | −5 | −3 | +3 | +3 | −5 | −5 |
| Gelation properties at room temp. (min. at 23° C.) | | 20 | 6 | 15 | 3 | Not cured | — |
| Properties of cured material | Shear strength (MPa) | 1.2 Cohesive failure | 2.1 Cohesive failure | 1.7 Cohesive failure | 2.2 Cohesive failure | 0.7 Cohesive failure | — |
| | Strength at break (MPa) | 0.5 | 0.8 | 0.7 | 1.1 | 0.3 | — |
| | Elongation (%) | 350 | 250 | 180 | 150 | 230 | — |
| Resistance to showering (after 30 minutes) | | A | A | A | A | B | — |
| Resistance to chipping (kg M4 nut) | | 8 | 12 | 22 | 23 | 5 | — |

Note:
1) Gradient type acrylic resin "LP-3106" manufactured by Mitsubishi Rayon Co., Ltd.
2) Bisphenol F epoxy resin "Epikote 807" manufactured by Japan Epoxy Resin Co. Ltd.

The results in Table 1 show that the compositions of Examples 1-4 according to the present invention had good gelation properties at room temperature, that is, they gelled in a period of time from 6 minutes to 20 minutes, and that the applied gelled materials were not deformed in the showering test carried out after mixing liquids A and B and keeping them at 23° C. for 30 minutes.

In contrast, the composition of Comparative Example 1 did not gel at room temperature since it compounded no gelling agent. As a result, the flying of the applied material was observed in the showering test. The composition of Comparative Example 2 gelled during the preparation of liquid A since the gelling agent was compounded in liquid A.

The invention claimed is:

1. A two-pack curable composition for use in an automobile manufacturing line comprising:

(a) plastisol liquid A which contains a plasticizer and a non-aqueous thermoplastic resin selected from the group consisting of polyvinyl chloride, vinyl chloride-vinyl acetate copolymers, core-shell acrylic resins and gradient acrylic resins, and (b) liquid B which contains a gelling agent selected from the group consisting of acrylate ester monomers, methacrylate ester monomers, and vinyl chloride monomer, wherein said composition gels at room temperature on mixing liquid A and liquid B, and wherein the gelling time of the mixture of liquids A and B is from 30 seconds to 60 minutes at room temperature after mixing, and wherein when the thermoplastic resin is selected from the group consisting of core-shell acrylic resins and gradient acrylic resins, the gelling agent is selected from the group consisting of acrylate ester monomers and methacrylate ester monomers, and wherein when the thermoplastic resin is selected from the group consisting of polyvinyl chloride and vinyl chloride-vinyl acetate copolymers, the gelling agent is vinyl chloride monomer.

2. A two-pack curable composition for use in an automobile manufacturing line according to claim 1, wherein liquid B contains a component which dissolves or swells the thermoplastic resin in liquid A.

3. A two-pack curable composition for use in an automobile manufacturing line according to claim 1, further comprising a thermosetting resin and a latent curing agent.

4. A two-pack curable composition for use in an automobile manufacturing line according to claim 3, wherein the thermosetting resin is an epoxy resin.

5. A two-pack curable composition for use in an automobile manufacturing line according to claim 1, wherein the mixture of liquids A and B has a sprayable viscosity.

6. A two-pack curable composition for use in an automobile manufacturing line according to claim 1, which compounds 50 to 150 parts by weight of the gelling agent per 100 parts by weight of the thermoplastic resin.

7. A two-pack curable composition for use in an automobile manufacturing line according to claim 1, wherein the mixture of liquids A and B has a viscosity of 50 to 200 Pas at 20° C.

8. A process for sealing automobile body parts comprising the steps of applying, as a body or seam sealer in an automobile manufacturing line, a two-pack curable composition according to claim 1 to automobile body parts assembled by spot-welding, the parts having been press molded in a body-welding step of an automobile manufacturing line and passing said assembled automobile body parts through a coating step and an assembling step while said curable composition is in a gelled state.

9. A process for coating an automobile body part comprising the steps of applying, as an underbody coating in an automobile manufacturing line, a two-pack curable composition according to claim 1 to the automobile body parts assembled by spot-welding, the parts having been press molded in a body-welding step of an automobile manufacturing line and passing said assembled automobile body parts through a coating step and an assembling step while the composition is in a gelled state.

10. A process for bonding automobile body parts comprising the steps of applying, as an adhesive in an automobile manufacturing line, a two-pack curable composition according to claim 1, to the automobile body parts having been press molded in a body-welding step of an automobile manufacturing line and gelling said curable composition, whereby the deformation of the adhesive is prevented in subsequent treating steps.

* * * * *